(12) United States Patent
El-Khamy et al.

(10) Patent No.: US 11,526,970 B2
(45) Date of Patent: Dec. 13, 2022

(54) SYSTEM AND METHOD FOR VIDEO PROCESSING WITH ENHANCED TEMPORAL CONSISTENCY

(71) Applicant: Samsung Electronics Co., Ltd., Gyeonggi-do (KR)

(72) Inventors: Mostafa El-Khamy, San Diego, CA (US); Ryan Szeto, Ann Arbor, MI (US); Jungwon Lee, San Diego, CA (US)

(73) Assignee: Samsung Electronics Co., Ltd

( * ) Notice: Subject to any disclaimer, the term of this patent is extended or adjusted under 35 U.S.C. 154(b) by 323 days.

(21) Appl. No.: 16/842,386

(22) Filed: Apr. 7, 2020

(65) Prior Publication Data

US 2021/0065340 A1      Mar. 4, 2021

Related U.S. Application Data

(60) Provisional application No. 62/895,811, filed on Sep. 4, 2019.

(51) Int. Cl.
*G06K 9/00* (2022.01)
*G06T 5/50* (2006.01)
*H04N 7/01* (2006.01)
*G06T 3/00* (2006.01)
*G06T 5/00* (2006.01)

(52) U.S. Cl.
CPC ............. *G06T 5/50* (2013.01); *G06T 3/0093* (2013.01); *G06T 5/005* (2013.01); *H04N 7/0127* (2013.01); *H04N 7/0135* (2013.01); *G06T 2207/10016* (2013.01); *G06T 2207/20216* (2013.01)

(58) Field of Classification Search
CPC ......... G06T 5/50; G06T 3/0093; G06T 5/005; G06T 2207/10016; G06T 2207/20216; G06T 3/4007; G06T 3/4053; G06T 5/002; H04N 7/0127; H04N 7/0135; H04N 19/587
See application file for complete search history.

(56) References Cited

U.S. PATENT DOCUMENTS

| | | | |
|---|---|---|---|
| 6,192,079 | B1 | 2/2001 | Sharma et al. |
| 7,197,075 | B2 | 3/2007 | Akimoto et al. |
| 7,218,796 | B2 | 5/2007 | Bishop et al. |

(Continued)

OTHER PUBLICATIONS

Song, Hwangjun, and C-C. Jay Kuo. "A sliding window approach to real-time H. 263+ frame rate adjustment." Conference Record of Thirty-Second Asilomar Conference on Signals, Systems and Computers (Cat. No. 98CH36284). vol. 1. IEEE, 1998. (Year: 1998).*

(Continued)

*Primary Examiner* — Andrew M Moyer
(74) *Attorney, Agent, or Firm* — The Farrell Law Firm, P.C.

(57) ABSTRACT

A system and method for processing an input video while maintaining temporal consistency across video frames is provided. The method includes converting the input video from a first frame rate to a second frame rate, wherein the second frame rate is a faster frame rate than the first frame rate; generating processed frames of the input video at the second frame rate; and aggregating the processed frames using temporal sliding window aggregation to yield a processed output video at a third frame rate.

18 Claims, 7 Drawing Sheets

(56) References Cited

U.S. PATENT DOCUMENTS

| | | | |
|---|---|---|---|
| 7,242,850 B2 | 7/2007 | Cok | |
| 8,472,524 B2 | 6/2013 | Lu | |
| 9,392,215 B2 | 7/2016 | Weisgerber | |
| 2004/0061786 A1* | 4/2004 | Fletcher ................. | H04N 9/646 348/E7.086 |
| 2004/0091046 A1 | 5/2004 | Akimoto et al. | |
| 2007/0229703 A1* | 10/2007 | Lu ......................... | H04N 7/014 348/E7.013 |
| 2014/0232933 A1 | 8/2014 | Weisgerber | |
| 2016/0065990 A1* | 3/2016 | Shimizu ............... | H04N 19/176 375/240.12 |
| 2019/0138889 A1* | 5/2019 | Jiang ...................... | G06T 7/251 |

OTHER PUBLICATIONS

Dong, X., Bonev, B., Zhu, Y., Yuille, A.L.: Region-based temporally consistent video post-processing. In: IEEE Conference on Computer Vision and Pattern Recognition, IEEE (2015), 12 714-722.

Bonneel, N., Tompkin, J., Sunkavalli, K., Sun, D., Paris, S., Pfister, H.: Blind video temporal consistency. ACM Transactions on Graphics 34 (2015) 1-9.

Lai, W.S., Huang, J.B., Wang, O., Schechtman, E., Yumer, E., Yang, M.H.: Learning Blind Video Temporal Conistency. In: European Conference on Computer Vision (2018).

* cited by examiner

SYSTEM AND METHOD FOR VIDEO PROCESSING WITH ENHANCED TEMPORAL CONSISTENCY

PRIORITY

This application is based on and claims priority under 35 U.S.C. § 119(e) to U.S. Provisional Patent Application filed on Sep. 4, 2019 in the United States Patent and Trademark Office and assigned Ser. No. 62/895,811, the entire contents of which are incorporated herein by reference.

FIELD

The present disclosure generally relates to video processing. In particular, the present disclosure relates to a system and method for processing a video based on temporal characteristics among video frames.

BACKGROUND

Videos are a series of frames that are played at a particular frame rate. Videos may be processed frame by frame using known video processing techniques, such as video editing, video colorization, video inpainting, video enhancing, video super-resolution processing, and video style transfer processing.

A video processed using known processing techniques frequently results in a video which is temporally incoherent due to variations between consecutive frames, resulting in flickering during video playback. Thus, post processing may be needed to render the video frames temporally consistent. Post processing may require a large amount of computer processing resources to account for all of the information provided in each video frame.

Thus, it may be advantageous to provide video processing techniques capable of generating video frames with enhanced temporal consistency, thereby mitigating the need to provide additional processing (i.e., post processing) to correct temporal variations among video frames.

SUMMARY

According to one embodiment, a method for processing an input video while maintaining temporal consistency across video frames is provided. The method includes converting the input video from a first frame rate to a second frame rate, wherein the second frame rate is a faster frame rate than the first frame rate; generating processed frames of the input video at the second frame rate; and aggregating the processed frames using temporal sliding window aggregation to yield a processed output video at a third frame rate.

According to one embodiment, a system for processing an input video while maintaining temporal consistency across video frames is provided. The system includes a non-transitory computer readable memory and a processor, wherein the processor is configured to, upon executing instructions stored in the non-transitory computer readable memory, convert the input video from a first frame rate to a second frame rate, wherein the second frame rate is a faster frame rate than the first frame rate; generate processed frames of the input video at the second frame rate; and aggregate the processed frames using temporal sliding window aggregation to yield a processed output video at a third frame rate

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1$^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

In the era of deep learning, where many algorithms are learning-based algorithms, it may be difficult to collect data necessary to train the algorithms to produce satisfactory output videos. Additionally, when video processing algorithms consider information from neighboring frames, temporal information is frequently overlooked and video processing is still done frame-by-frame. Also, if consecutive frames include significant variations, then the processed video may be temporally inconsistent or incoherent.

Multiframe processing may refer to an algorithm that processes multiple frames in a sequence of frames (i.e., video frames). These frames may have temporal coherence between them. However, the frame rate and the speed of objects in the frames may determine how much variation can be observed between consecutive frames.

Thus, if a sequence of frames is incomplete with missing pixels, a multiframe processing system and method may be used to replace the missing regions (i.e., areas of frames corresponding to missing pixels) with accurate (i.e., realistic) values (i.e., pixel values).

The present disclosure provides a system and method including a frame processing algorithm for processing video frames at a higher frame rate and aggregating the results across time to a target frame rate. The system may include an electronic device and/or processor for performing operations of the method.

For example, image inpainting may be a type of image processing algorithm that can be performed on the video frames at the higher frame rate.

Image inpainting may be defined as the task of replacing a set of missing pixels in an image with realistic values. For example, image inpainting may be performed to accomplish watermark removal and/or object removal in a video.

Image inpainting may feature a two stage network architecture in which a first stage generates a coarse prediction, and a second stage refines a predicted pixel value by considering two streams (i.e., a foreground stream and a background stream of an image).

In order to improve features inside an area of the image to be corrected, an inpainting module may reconstruct foreground patches inside the inpainted area by taking a weighted sum of background patches outside the inpainted area. Weights used to determine the weighted sum may be computed as a correlation between foreground and background patches. Additionally, the correlation and reconstruction operations of image inpainting may be performed in parallel by stacking the background patches to perform convolution with the foreground (e.g., unoccluded) region, other background patches, and/or correlation values.

Additionally, image inpainting may be performed without relying on placeholder values of the occluded region, which can cause unexpected behavior during inference, by replacing normal convolution layers of an existing encoder-decoder network with partial convolution layers. Partial convolution layers may take both an input tensor (e.g., data formed as a matrix or vector) and a mask as arguments, and compute a value at each output location as a normalized weighted sum of unmasked input values.

In addition, image inpainting may successfully reconstruct images by accounting for two types of losses, reconstruction loss and adversarial loss.

Reconstruction loss may be used to determine pixel-wise distances between full frames of the predicted and the actual images, and scale each pixel's contribution based on its distance from the closest known pixel. Adversarial loss may update a discriminator jointly with an image inpainting model. The reconstruction loss and the adversarial loss may be jointly optimized for improved image inpainting.

When considering large, contiguous occluded regions of an image, such as contiguous frames in a video sequence, it may be beneficial to identify context frames which contain similar information in corresponding regions of an image from one frame to the next.

Image inpainting may be extended to account for a video consisting of a number of image frames in a temporal direction (e.g., contiguous frames) by reconstructing features of a reference frame (e.g., a particular frame in a video sequence) based on the reference frame itself, as well as multiple context frames. To achieve this, background patches may be extracted from both the reference frame and the context frames, and convoluted with the foreground region of the reference frame. The result may then be normalized based on a weight that is assigned according to a location within the image.

With regards to video inpainting, however, the added dimension of time introduces additional criteria that must be satisfied. For example, content among nearby frames should be consistent, and the apparent motion between them should be realistic.

The present disclosure provides a system and method to perform image processing (e.g., inpainting) on video frames, accounting for temporal characteristics of the individual frames without necessarily relying on complicated time-dependent algorithms to perform image processing.

Figure 1:
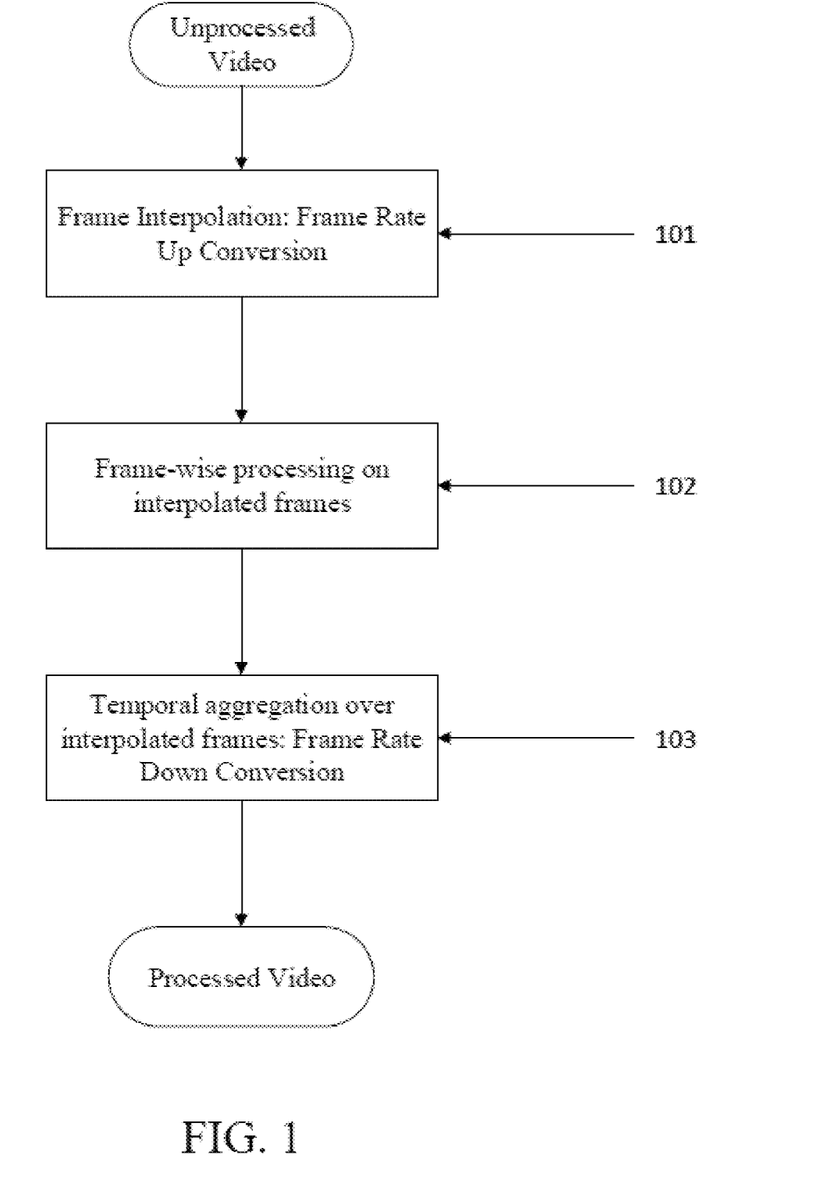
FIG. 1 illustrates a flowchart for temporal up-conversion and aggregation, according to an embodiment.

FIG. 1 illustrates a flowchart for temporal up-conversion and aggregation, according to an embodiment.

Referring to FIG. 1, in step 101, the system increases the frame rate of occluded input video using a frame interpolation method that temporally up-samples the un-processed video to generate a high frame-rate interpolated video.

In step 102, the system deploys a frame-wise processing algorithm on the high frame-rate interpolated video to generate a high frame-rate output video. Each frame in the high frame-rate interpolated video is processed independently using frame-wise processing (e.g., an image inpainting application or an application for applying a style to each frame).

In step 103, the frames in the high frame-rate output video are aligned and aggregated within overlapping windows of an appropriate stride (e.g., a number of frames) to obtain an output video at a target frame rate.

Figure 2:
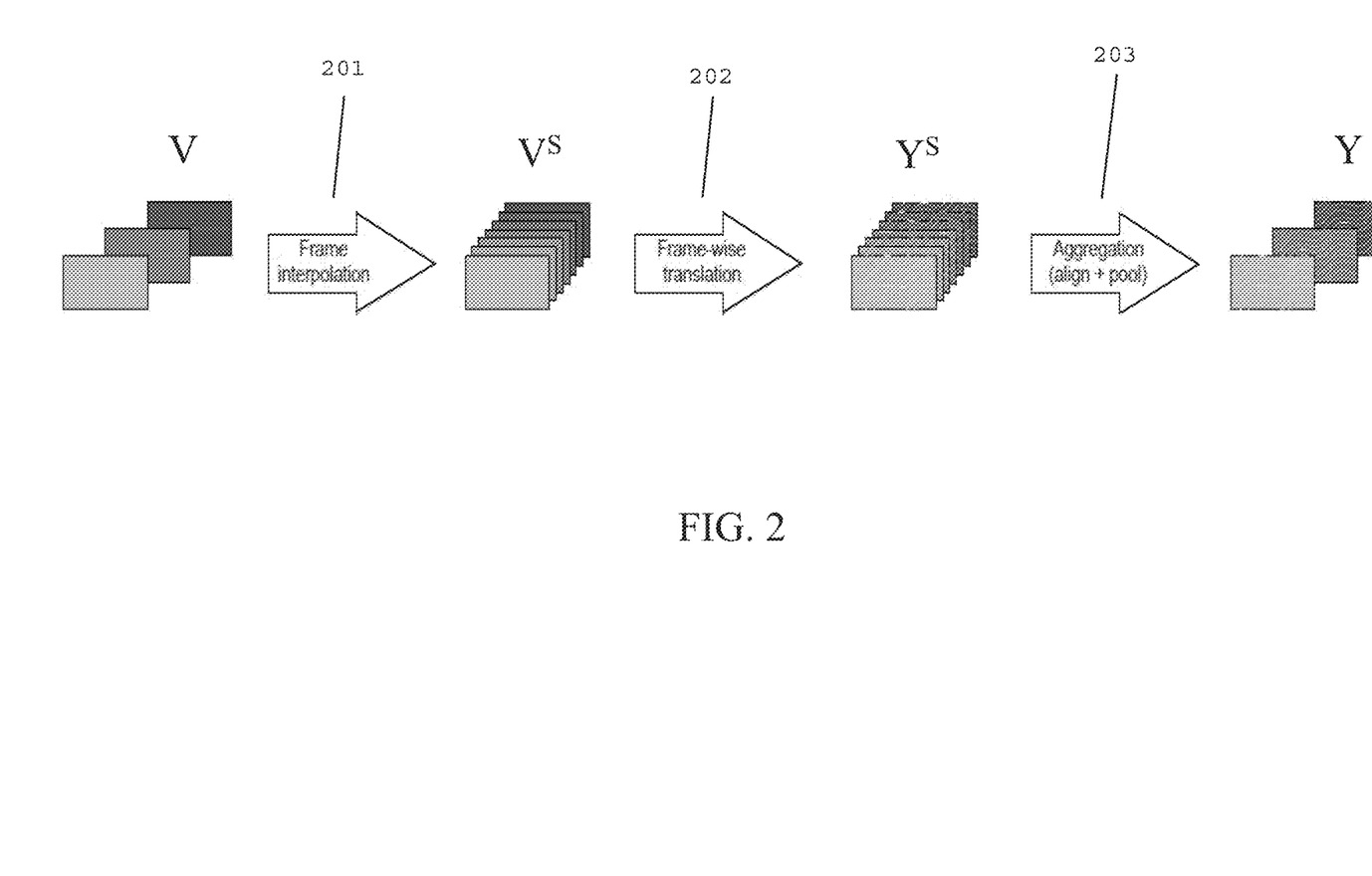
FIG. 2 illustrates frames during temporal up-conversion and aggregation, according to an embodiment.

Steps 101, 102, and 103 may be visualized by viewing the frames shown in FIG. 2.

FIG. 2 illustrates frames during temporal up-conversion and aggregation, according to an embodiment.

Steps 201, 202, and 203 in FIG. 2 may respectively correspond to steps 101, 102, and 103 in FIG. 1.

Referring to FIG. 2, an un-processed video V running at an original frame rate R_o may be provided as input, and after performing steps 201, 202, and 203, a processed video Y running at a target frame rate R_t may be provided as output.

In step 201, frame rate up-conversion (FRUC) is performed to upsample the input un-processed video V frame rate from R_o to R_u, where R_u is a higher video frame rate than R_o.

Temporal up-conversion (e.g., FRUC) may interpolate variations of illumination, color, and motion between consecutive frames and produce intermediate frames having a less drastic variation of motion, illumination, and/or color than the consecutive frames. Moreover, the interpolated frames may carry temporal information from left (L) and right (R) (e.g., forward and backward) reference frames.

FRUC may be performed using conventional frame interpolation techniques. Additionally or alternatively, FRUC may be performed using deep learning techniques by predicting a pair of optical flow warping grids used to warp the input frames to a particular time step.

For example, FRUC may be performed by estimating forward and backward optical flows between a first frame at a first time step to a second frame at a second time step, and estimating forward and backward warping grids between the first frame at the first time step to the second frame at the second time step. The forward optical flow and the forward warping grid may correspond to a forward direction and the backward optical flow and the backward warping grid may correspond to a backward direction.

The warping grids may be estimated for each intermediate frame between the first frame at the first time step to the second frame to the second time step. The second time step may be an arbitrary time step with respect to the first time step. The warping grids may be estimated as a weighted sum of linearly interpolated optical flows from the L and R frames, according to Equation (1) and Equation (2):

$$O_{-t->L} = -(1-t)t*O_{-L->R} - t^2 O_{-R->L} \quad (1)$$

$$O_{-t->R} = (1-t^2)O_{-L->R} - t(1-t)O_{-R->L} \quad (2)$$

In Equation (1) and Equation (2), the interpolated optical flow from the left frame is $O_{-t->L}$ and the interpolated optical flow from the right frame is $O_{-t->R}$. The left and right frames may be interpolated to an intermediate time step t, using the interpolated optical flows $O_{-y->L}$ and $O_{-t->R}$, giving a warped frame interpolated in the forward (e.g., from the L) direction $F_{-t}(L)$, and a warped frame interpolated in the backward (e.g., from the R) direction $F_{-t}(R)$.

Additionally, a weight mask may be estimated and used for summing the warped frames from the L and the R directions, so the frame at intermediate time step t, $F_{-t}$, is defined by Equation (3):

$$F_{-t} = w_{-L}*F_{-t}(L) + w_{-R}*F_{-t}(R) \quad (3)$$

In Equation (3), $w_{-L}$, is a weight mask for summing the warped frames from the left and $w_{-R}$ is a weight mask for summing the warped frames from the right.

In step 202, frame-wise translation is performed on the interpolated frames.

Frame-wise translation (e.g., processing) on the intermediate (e.g., interpolated) frames may yield results which are different than those obtained on reference, non-interpolated, frames because intermediate frames may carry characteristics and/or features from left and right frames (e.g., context frames) since they are obtained from interpolation in both the forward and backward directions.

To perform frame-wise processing, high frame-rate video composed of time interpolated frames $V^S$ may be processed at time t using a frame-wise algorithm including one or more frame-wise processing techniques, such that at least one unprocessed interpolated frame $F_{-t}$ is processed as at least one processed frame $P(F_{-t})$ by frame-wise algorithm P.

The frame-wise algorithm P may be a number of different types of frame-wise image processing algorithms. For example, the frame-wise algorithm P may be an inpainting algorithm capable of inpainting each frame independently using a contextual attention inpainting network. Additionally or alternatively, the frame-wise algorithm P may be an algorithm capable of applying a particular style to the interpolated frames, such as a blur removal algorithm or a darkness removal algorithm. Many different types of frame-wise algorithms may be applied to the upsampled video frames $V^S$.

In step 203, frame rate down-conversion is performed by aggregating frames. In particular, the processed high frame-rate video $Y^S$ may be temporally aggregated using sliding window aggregation by temporally combining the interpolated processed frames to yield the processed video Y at a target frame rate R_t. The target frame rate R_t may be the original frame rate R_o.

In the temporal aggregation process, information from the processed interpolated frames from the processed high frame-rate video $Y^S$ may be carried backward to the preceding (i.e., left) reference frame and forward to the following (i.e., right) reference frame, thereby improving temporal consistency between processed frames at the target frame rate R_t after aggregation.

A processed video Y at the target frame rate R_t may be a combination of processed frames, when t corresponds to time interpolations around a target frame given a particular upsampling rate u (e.g., corresponding to a particular time step).

A processed video may be aggregated to a target frame rate R_t according to Equation (4):

$$P(F_{-L}) = Agg(P(F_{-\{uL-m\}}), P(F_{-\{uL-m+1\}}), \ldots, P(F_{-\{uL\}}), P(F_{-\{uL+1\}}), ) \ldots P(F_{-\{uL+m\}})) \quad (4)$$

In Equation (4), m may be a function of the window size such that "2m+1" is the window size for aggregation, and b may represent a number between –m and m to indicate an index of a processed hyperframe (e.g., an upsampled frame) in the target window. The aggregate function (Agg( )) may calculate the optical flow $O_{-(uL+b)->uL}$ between each of the processed frames $P(F_{-\{uL+b\}})$ to the processed target frame $P(F_{-\{uL\}})$. The interpolated frame $F_{-(uL+b)}$ may be warped to the target frame $F_{-uL}$ using the calculated optical flow $O_{-(uL+b)->uL}$, resulting in a warped frame $W_{-(uL+b)->uL}$. A processed frame $P(F_{-L})$ may be temporally aggregated by using a weight $r_{-b}$ to sum warped frames based on Equation (5):

$$P(F_{-L}) = SUM_{-(b\ in\ \{-m:m\})}(r_{-b}W_{-(uL+b)->uL}) \quad (5)$$

In Equation (5), weight $r_{-b}$ may have a smaller weight value for frames that are farther from the target frame, or that have a larger absolute value of b.

Different types of frame-wise processing may be used to process the interpolated frames. For example, image inpainting may be a type of single frame processing in which spatial holes (sets or regions of pixels) in an image are replaced with realistic values. Additionally or alternatively, style transfer processing, stylization processing, super-resolution processing, denoising processing, enhancement processing, sharpening processing, and shadow reduction processing may be types of frame-wise processing used to process the interpolated frames.

Video inpainting is another type of processing that may be applied to the present disclosure. Video inpainting is an example of video multiframe processing capable of replacing spatial-temporal holes in a video with realistic and plausible contents (i.e., values).

Compared to image inpainting, video inpainting, which performs processing amongst temporal frames, is more complex. For example, information replaced in one frame should be temporally consistent with similar information that is replaced in neighboring frames. This becomes particularly challenging when there is significant motion between frames.

Figure 3:
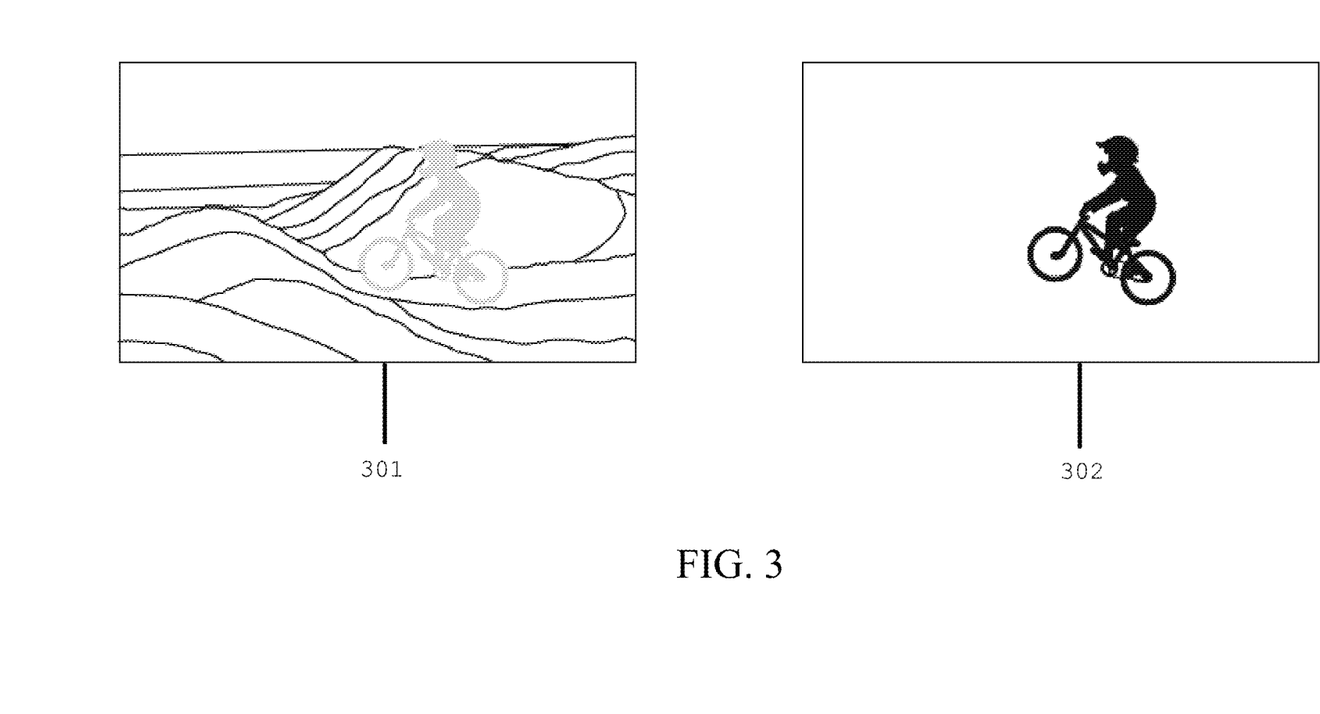
FIG. 3 illustrates an input video frame and a mask for performing video inpainting, according to an embodiment.

FIG. 3 illustrates an input video frame and a mask for performing video inpainting, according to an embodiment.

Referring to FIG. 3, in order to perform video inpainting, each of the unprocessed occluded input video frames 301 may be accompanied by a mask 302 (e.g., an occlusion mask). The mask 302 corresponds to the regions of the input video frame 301 to inpaint. A mask 302 may exist for each input video frame 301 for every time step in the input video. Additionally, mask frames 302 may be upsampled with input video frames (e.g., step 101) so that video inpainting can be performed at a high, upsampled frame rate R_u.

Figure 4A:
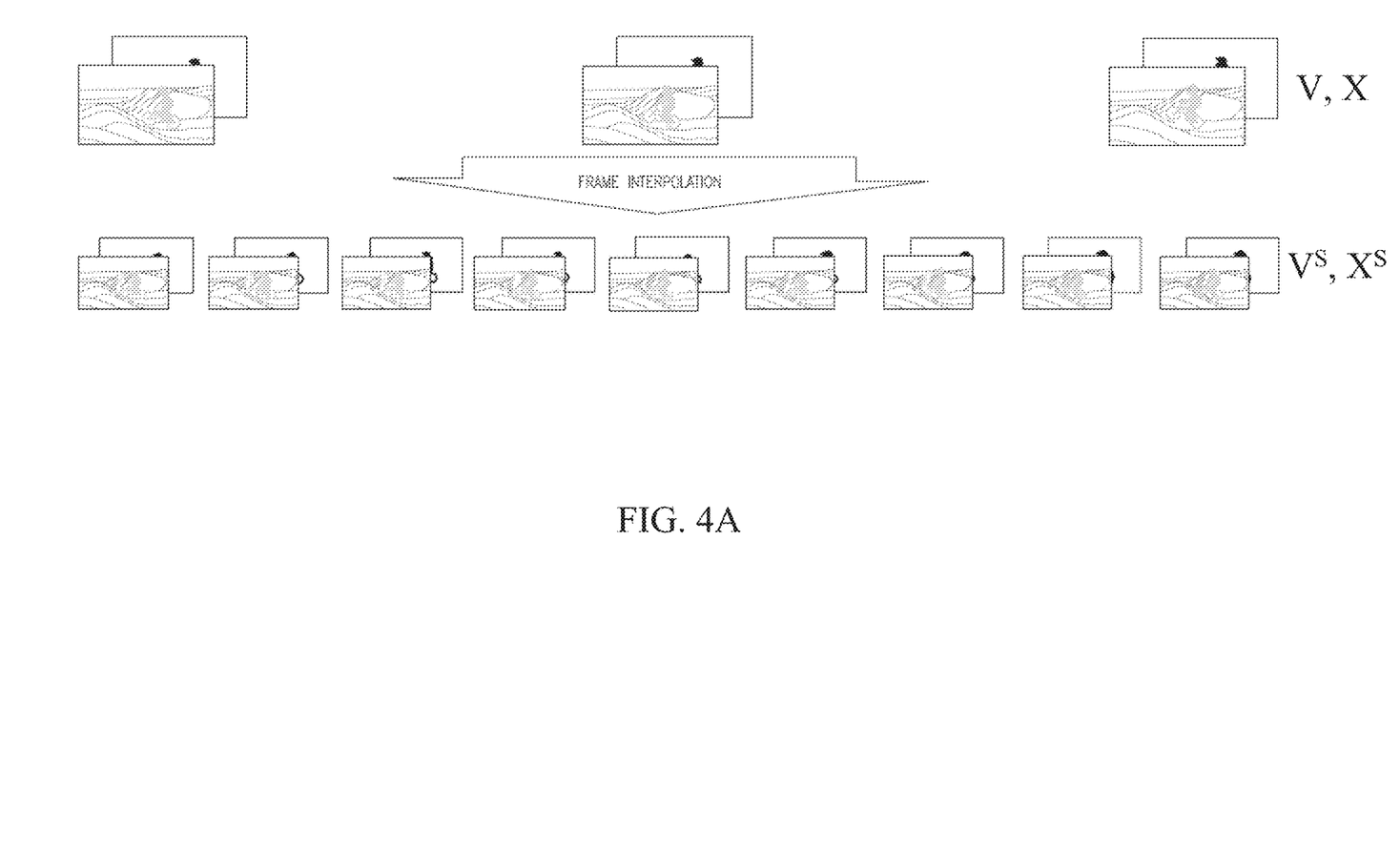
FIG. 4A illustrates a frame interpolation step for performing video inpainting, according to an embodiment.
Figure 4B:
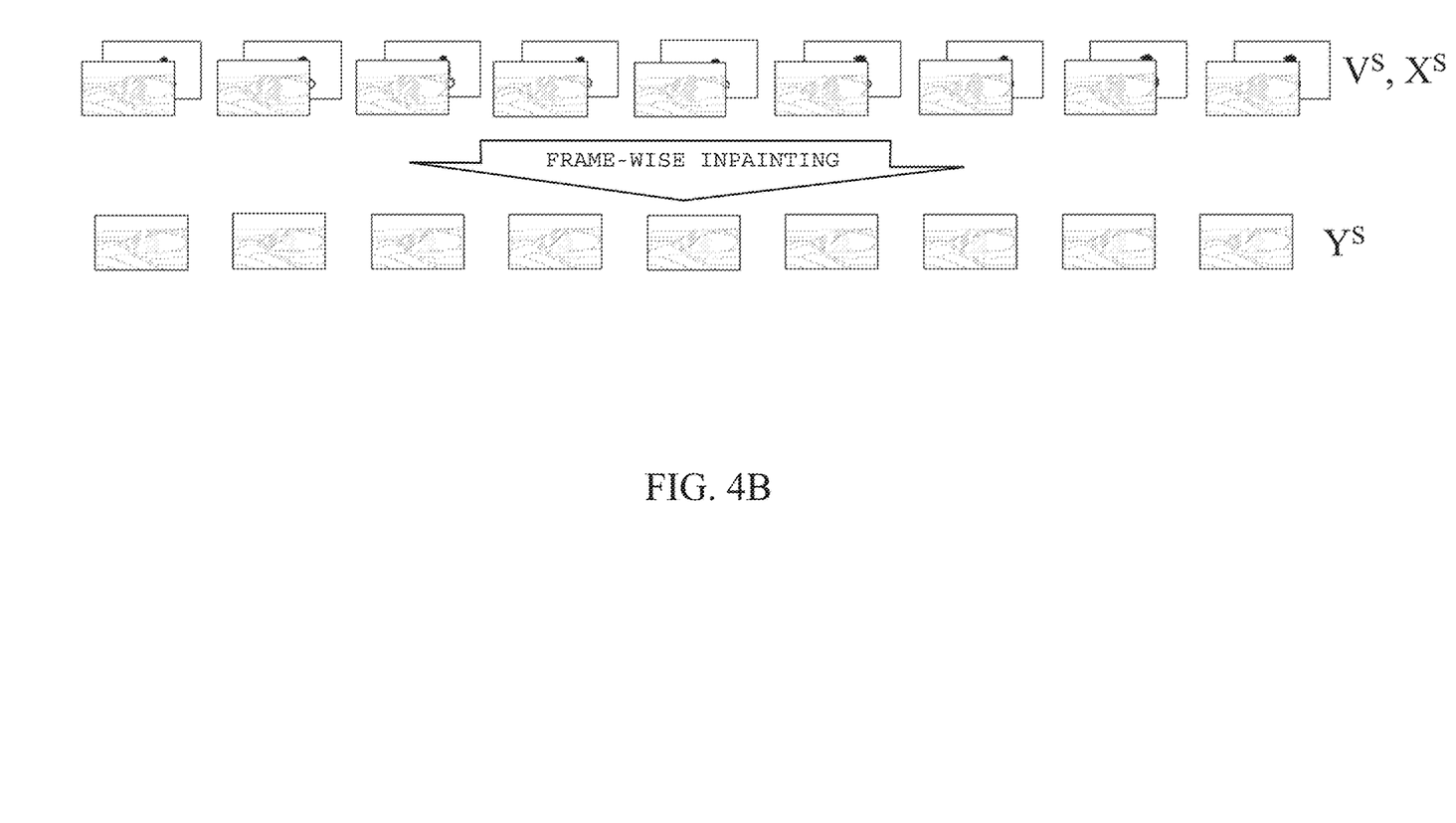
FIG. 4B illustrates a frame-wise inpainting step for performing video inpainting, according to an embodiment.
Figure 4C:
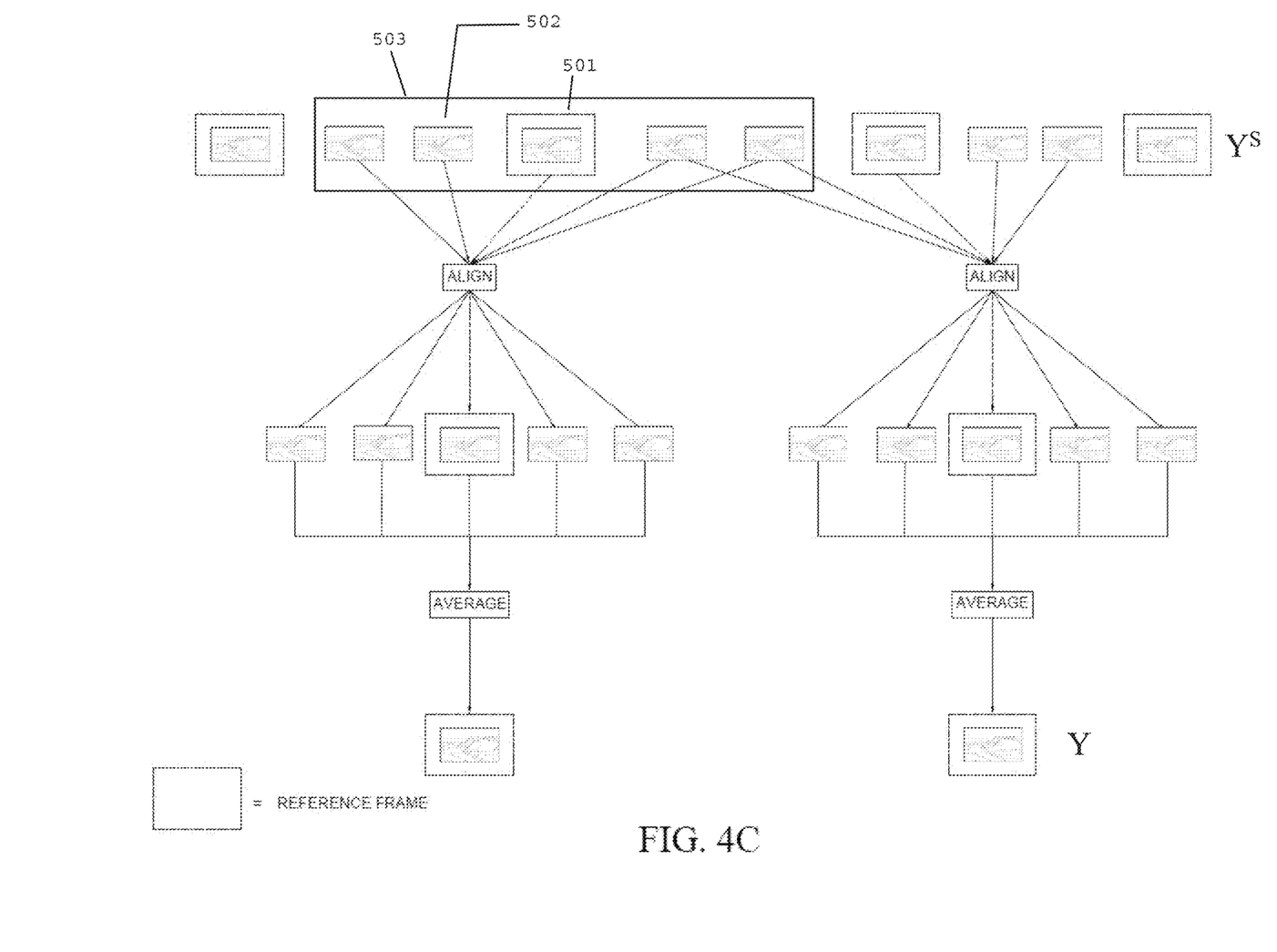
FIG. 4C illustrates a temporal aggregation step, according to an embodiment.

Accordingly, FIGS. 4A-4C illustrate a video inpainting, where FIG. 4A corresponds to step 101, FIG. 4B corresponds to step 102, and FIG. 4C corresponds to step 103.

FIG. 4A illustrates a frame interpolation step for performing video inpainting, according to an embodiment.

Referring to FIG. 4A, V denotes an input video (i.e., a red green blue (RGB) video) and may be made up of $\{v_1, \ldots, v_N\}$ frames, and X denotes an occlusion mask and may be made up of $\{x_1, \ldots, x_N\}$ frames. Together, $V\{v_1, \ldots, v_N\}$ and $X\{x_1, \ldots, x_N\}$ indicate the regions to inpaint when pixels are occluded in V. Additionally, the occluded pixels may have a placeholder value to recognize their locations in a frame.

To perform the video inpainting technique, a controller may accept $V\{v_1, \ldots, v_N\}$ and $X\{x_1, \ldots, x_N\}$ as inputs and output $Y = \{y_1, \ldots, y_N\}$, where $Y = \{y_1, \ldots, y_N\}$ includes values that are the same as $V\{v_1, \ldots, v_N\}$, except the occluded pixels have been replaced with realistic and plausible values by removing and replacing one or more occluded regions.

For example, the video inpainting technique may increase the frame rate of the occluded video ($V\{v_1, \ldots, v_N\}$ and $X\{x_1, \ldots, x_N\}$) artificially with temporal up-conversion (e.g., FRUC), by applying the same warping operations to the frames included in the video $V\{v_1, \ldots, v_N\}$ and the frames included in the mask $X\{x_1, \ldots, x_N\}$. As illustrated in FIG. 4A, a high-frame per second (FPS) mask $X^S$ may be generated for each frame of the high-FPS occluded video $V^S$.

Additionally or alternatively, to perform temporal upsampling, a number of frames may be inserted between each pair of frames in the occluded video V and the occluded mask X with a frame up-conversion method, such as Super SloMo, FRUC, and/or frame interpolation, to create a high-FPS version of V and X. The high-FPS version of the occluded video, $V^S$, may be made up of $\{v_{s1}, \ldots, v_{sN}\}$ frames, and the high-FPS version of the occlusion masks, denoted as $X^S$, may be made up of $\{x_{s1}, \ldots, x_{sN}\}$ frames.

The frame up-conversion method may be capable of generating multiple intermediate frames between each pair of frames in the occluded video V and the occlusion mask X. In addition, for a given time step, a pair of optical flow warping grids may be used to warp the frames in the occluded video V and the occluded mask X to that time step.

FIG. 4B illustrates a frame-wise inpainting step for performing video inpainting, according to an embodiment.

Referring to FIG. 4B, after the high-FPS versions of the occluded video $V^S$ and the occluded masks $X^S$ are obtained, each frame of the high-FPS occluded video may be independently inpainted to produce high-FPS output video $Y^S$.

Independently inpainting frames on a high-FPS occluded video advantageously uses less processing power than temporal video inpainting, which must account for differences among frames based on time. The video inpainting embodiment of the present disclosure, however, does consider temporal factors amongst frames upon aggregating frames of the high-FPS video.

FIG. 4C illustrates a temporal aggregation step, according to an embodiment.

Temporal aggregation, as illustrated in FIG. 4C, may be applied when aggregating processed frames (e.g., after performing inpainting on interpolated frames or after performing another type of image processing on interpolated frames). Specifically, after the high-FPS output video $Y^S$ is generated, frames in the high-FPS output video $Y^S$ may be aligned and averaged over a sliding window with an appropriate stride (i.e., length or number of frames) to produce frames for the final output video Y.

To perform temporal aggregation, processed frames may be aligned and averaged within overlapping windows of a predetermined stride (i.e., length or a number of frames) in the high-FPS output video $Y^S$ to obtain output $Y = \{y_1, \ldots, y_N\}$.

Specifically, at least one reference frame 501 may be identified in the high-FPS output video $Y^S$. At least one context frame 502 surrounds the reference frame 501 before or after the reference frame 501 in a temporal direction.

As shown in FIG. 4C, a sliding window 503 having a length of five reference frames is selected, including one reference frame 501 and four context frames. The sliding window 503 may be oriented with respect to the reference frame 501 such that the reference frame is aligned (e.g., centered) within the window 503. That is, upon being aligned, the same number of context frames may be positioned on the left and right sides of the reference frame 501.

In FIG. 4C, a reference frame 501 is identified in the high-FPS output video $Y^S$ once every three frames. Thus, because the number of frames included in the sliding window 503 (e.g., five frames) is greater than the number of frames between reference frames (e.g., two frames), at least some of the context frames may be aligned with more than one reference frame. Aligning the same context frame with respect to a reference frame in the forward direction and with respect to a reference frame in the backward direction improves smoothness and image consistency among frames after aggregation.

After the frames of the high-FPS output video $Y^S$ have been aligned within each sliding window, the optical flow between each frame in the sliding window 503 may be estimated, and these frames may then be warped based on the optical flow. The final output frames included in the output video Y may be determined by averaging the warped frames with the reference frame 501.

Thus, according to the embodiments of the present disclosure, additional (i.e., post) processing may not be necessary to enforce temporal consistency among video frames.

Figure 5:
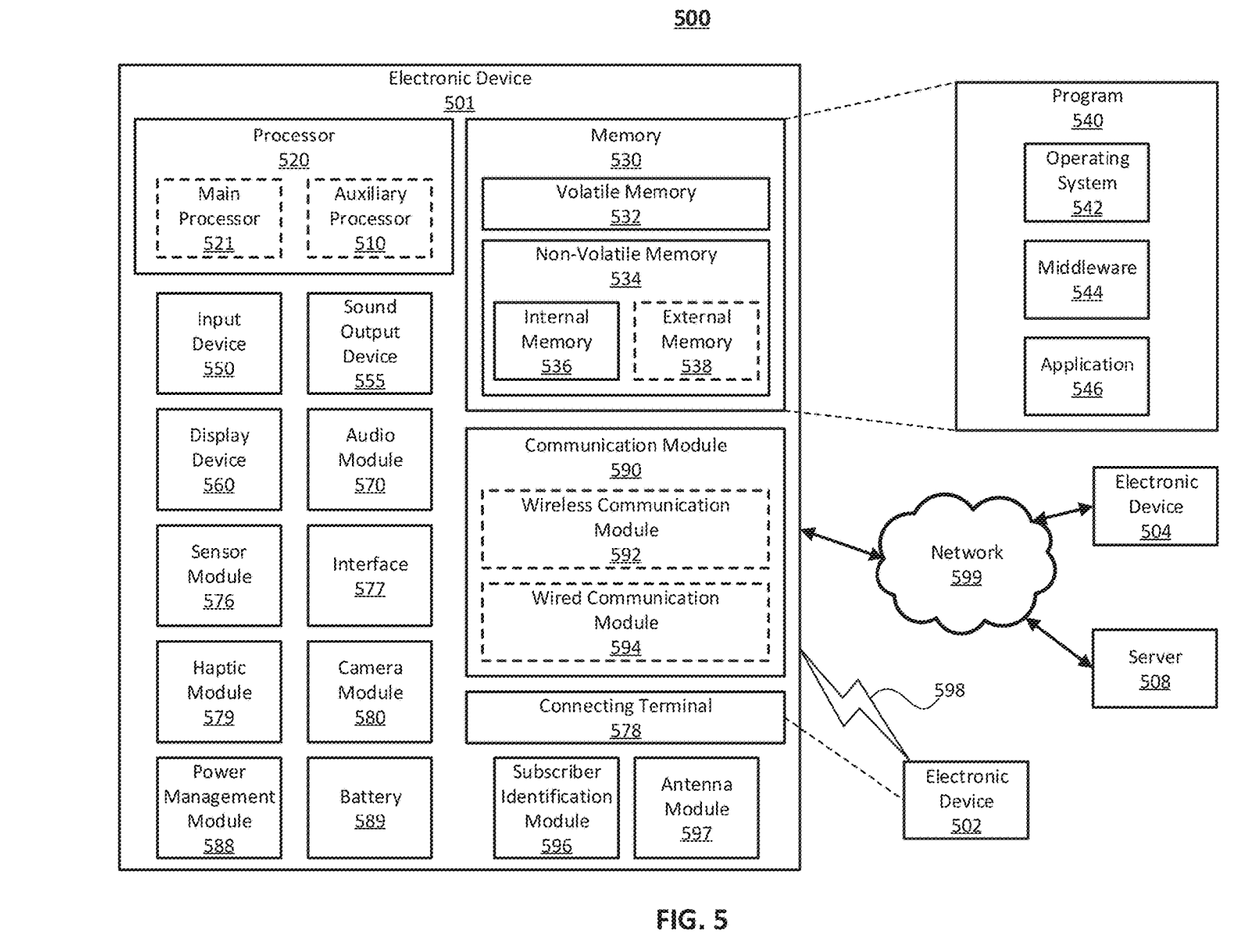
FIG. 5 illustrates a block diagram of an electronic device in a network environment, according to one embodiment.

FIG. 5 illustrates a block diagram of an electronic device 501 in a network environment 500, according to one embodiment. Referring to FIG. 5, the electronic device 501 in the network environment 500 may communicate with another electronic device 502 via a first network 598 (e.g., a short-range wireless communication network), or another electronic device 504 or a server 508 via a second network 599 (e.g., a long-range wireless communication network). The electronic device 501 may also communicate with the electronic device 504 via the server 508. The electronic device 501 may include a processor 520, a memory 530, an input device 550, a sound output device 555, a display device 560, an audio module 570, a sensor module 576, an interface 577, a haptic module 579, a camera module 580, a power management module 588, a battery 589, a communication module 590, a subscriber identification module (SIM) 596, or an antenna module 597. In one embodiment, at least one (e.g., the display device 560 or the camera module 580) of the components may be omitted from the electronic device 501, or one or more other components may be added to the electronic device 501. In one embodiment, some of the components may be implemented as a single integrated circuit (IC). For example, the sensor module 576 (e.g., a fingerprint sensor, an iris sensor, or an illuminance sensor) may be embedded in the display device 560 (e.g., a display).

The processor 520 may execute, for example, software (e.g., a program 540) to control at least one other component (e.g., a hardware or a software component) of the electronic device 501 coupled with the processor 520, and may perform various data processing or computations. As at least part of the data processing or computations, the processor 520 may load a command or data received from another component (e.g., the sensor module 576 or the communication module 590) in volatile memory 532, process the command or the data stored in the volatile memory 532, and store resulting data in non-volatile memory 534. The processor 520 may include a main processor 521 (e.g., a central processing unit (CPU) or an application processor (AP)), and an auxiliary processor 523 (e.g., a graphics processing unit (GPU), an image signal processor (ISP), a sensor hub processor, or a communication processor (CP)) that is operable independently from, or in conjunction with, the main processor 521. Additionally or alternatively, the auxiliary processor 523 may be adapted to consume less power than the main processor 521, or execute a particular function. The auxiliary processor 523 may be implemented as being separate from, or a part of, the main processor 521.

The auxiliary processor 523 may control at least some of the functions or states related to at least one component (e.g., the display device 560, the sensor module 576, or the communication module 590) among the components of the electronic device 501, instead of the main processor 521 while the main processor 521 is in an inactive (e.g., sleep) state, or together with the main processor 521 while the main processor 521 is in an active state (e.g., executing an application). According to one embodiment, the auxiliary processor 523 (e.g., an ISP or a CP) may be implemented as part of another component (e.g., the camera module 580 or the communication module 590) functionally related to the auxiliary processor 523.

The memory 530 may store various data used by at least one component (e.g., the processor 520 or the sensor module 576) of the electronic device 501. The various data may include, for example, software (e.g., the program 540) and input data or output data for a command related thereto. The memory 530 may include the volatile memory 532 or the non-volatile memory 534.

The program 540 may be stored in the memory 530 as software, and may include, for example, an operating system (OS) 542, middleware 544, or an application 546.

The input device 550 may receive a command or data to be used by other component (e.g., the processor 520) of the electronic device 501, from the outside (e.g., a user) of the electronic device 501. The input device 550 may include, for example, a microphone, a mouse, or a keyboard.

The sound output device 555 may output sound signals to the outside of the electronic device 501. The sound output device 555 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 560 may visually provide information to the outside (e.g., a user) of the electronic device 501. The display device 560 may include, for example, a display, a hologram device, or a projector and control circuitry to control a corresponding one of the display, hologram device, and projector. According to one embodiment, the display device 560 may include touch circuitry adapted to detect a touch, or sensor circuitry (e.g., a pressure sensor) adapted to measure the intensity of force incurred by the touch.

The audio module 570 may convert a sound into an electrical signal and vice versa. According to one embodiment, the audio module 570 may obtain the sound via the input device 550, or output the sound via the sound output device 555 or a headphone of an external electronic device 502 directly (e.g., wired) or wirelessly coupled with the electronic device 501.

The sensor module 576 may detect an operational state (e.g., power or temperature) of the electronic device 501 or an environmental state (e.g., a state of a user) external to the electronic device 501, and then generate an electrical signal or data value corresponding to the detected state. The sensor module 576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 577 may support one or more specified protocols to be used for the electronic device 501 to be coupled with the external electronic device 502 directly (e.g., wired) or wirelessly. According to one embodiment, the interface 577 may include, for example, a high definition multimedia interface (HDMI), a universal serial bus (USB) interface, a secure digital (SD) card interface, or an audio interface.

A connecting terminal 578 may include a connector via which the electronic device 501 may be physically connected with the external electronic device 502. According to one embodiment, the connecting terminal 578 may include, for example, an HDMI connector, a USB connector, an SD card connector, or an audio connector (e.g., a headphone connector).

The haptic module 579 may convert an electrical signal into a mechanical stimulus (e.g., a vibration or a movement) or an electrical stimulus which may be recognized by a user via tactile sensation or kinesthetic sensation. According to one embodiment, the haptic module 579 may include, for example, a motor, a piezoelectric element, or an electrical stimulator.

The camera module 580 may capture a still image or moving images. According to one embodiment, the camera module 580 may include one or more lenses, image sensors, ISPs, or flashes.

The power management module 588 may manage power supplied to the electronic device 501. The power management module 588 may be implemented as at least part of, for example, a power management integrated circuit (PMIC).

The battery 589 may supply power to at least one component of the electronic device 501. According to one embodiment, the battery 589 may include, for example, a primary cell which is not rechargeable, a secondary cell which is rechargeable, or a fuel cell.

The communication module 590 may support establishing a direct (e.g., wired) communication channel or a wireless communication channel between the electronic device 501 and the external electronic device (e.g., the electronic device 502, the electronic device 504, or the server 508) and performing communication via the established communication channel. The communication module 590 may include one or more CPs that are operable independently from the processor 520 (e.g., the AP) and supports a direct (e.g., wired) communication or a wireless communication. According to one embodiment, the communication module 590 may include a wireless communication module 592 (e.g., a cellular communication module, a short-range wireless communication module, or a global navigation satellite system (GNSS) communication module) or a wired communication module 594 (e.g., a local area network (LAN) communication module or a power line communication (PLC) module). A corresponding one of these communication modules may communicate with the external electronic device via the first network 598 (e.g., a short-range communication network, such as Bluetooth™, wireless-fidelity (Wi-Fi) direct, or a standard of the Infrared Data Association (IrDA)) or the second network 599 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 592 may identify and authenticate the electronic device 501 in a communication network, such as the first network 598 or the second network 599, using subscriber information (e.g., international mobile subscriber identity (IMSI)) stored in the subscriber identification module 596.

The antenna module 597 may transmit or receive a signal or power to or from the outside (e.g., the external electronic device) of the electronic device 501. According to one embodiment, the antenna module 597 may include one or more antennas, and, therefrom, at least one antenna appropriate for a communication scheme used in the communication network, such as the first network 598 or the second network 599, may be selected, for example, by the communication module 590 (e.g., the wireless communication module 592). The signal or the power may then be transmitted or received between the communication module 590 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 501 and the external electronic device 504 via the server 508 coupled with the second network 599. Each of the electronic devices 502 and 504 may be a device of a same type as, or a different type, from the electronic device 501. All or some of operations to be executed at the electronic device 501 may be executed at one or more of the external electronic devices 502, 504, or 508. For example, if the electronic device 501 should perform a function or a service automatically, or in response to a request from a user or another device, the electronic device 501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 501. The electronic device 501 may provide the outcome, with or without further processing of the outcome, as at least part of a reply to the request. To that end, a cloud computing, distributed computing, or client-server computing technology may be used, for example.

One embodiment may be implemented as software (e.g., the program 540) including one or more instructions that are stored in a storage medium (e.g., internal memory 536 or external memory 538) that is readable by a machine (e.g., the electronic device 501). For example, a processor of the electronic device 501 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method for processing an input video while maintaining temporal consistency across video frames, the method comprising:
    converting the input video from a first frame rate to a second frame rate, wherein the second frame rate is a faster frame rate than the first frame rate;
    generating processed frames of the input video at the second frame rate; and
    aggregating the processed frames using temporal sliding window aggregation to yield a processed output video at a third frame rate, which includes:
        aligning and averaging a first set of the processed frames oriented with respect to a first reference frame inside a temporal sliding window; and
        aligning and averaging a second set of the processed frames oriented with respect to a second reference frame inside the temporal sliding window,
    wherein the first set of processed frames and the second set of processed frames include at least one shared context frame, and
    wherein the at least one shared context frame is positioned after the first reference frame and before the second reference frame.

2. The method of claim 1, wherein converting the input video from the first frame rate to the second frame rate comprises:
    determining an intermediate frame by calculating a weighted sum of a first video frame at a first time step and a second video frame at a second time step.

3. The method of claim 2, wherein calculating the weighted sum of the first video frame at the first time step and the second video frame at the second time step comprises:
    calculating a forward warping grid from the first video frame to a third time step corresponding to the intermediate frame;
    calculating a backward warping grid from the second video frame to the third time step corresponding to the intermediate frame;
    determining the intermediate frame at the third time step by bilinearly warping the first video frame and the second video frame to the third time step.

4. The method of claim 1, wherein converting the input video from the first frame rate to the second frame rate comprises:
    converting both the input video and an occlusion mask from the first frame rate to the second frame rate,
    wherein the occlusion mask indicates regions of the input video to process.

5. The method of claim 4, wherein generating the processed frames of the input video at the second frame rate comprises:
    independently processing each frame of the input video at the second frame rate with the occlusion mask at the second frame rate, wherein generating the processed frames includes at least one of enhancement processing, sharpening processing, denoising processing, super-resolution processing, and inpainting processing.

6. The method of claim 1, wherein aggregating the processed frames using temporal sliding window aggregation comprises:
    selecting a temporal sliding window having a predetermined stride; and
    aligning and averaging at least some of the processed frames inside the temporal sliding window.

7. The method of claim 6, wherein the processed frames that are aligned and averaged inside of the temporal sliding window include the first reference frame and at least two context frames.

8. The method of claim 7, wherein the at least two context frames include at least one context frame positioned before the first reference frame and at least one context frame positioned after the first reference frame.

9. The method of claim 1, wherein the first frame rate is equal to the third frame rate.

10. A system for processing an input video while maintaining temporal consistency across video frames, the system comprising:
    a non-transitory computer readable memory and a processor, wherein the processor is, upon executing instructions stored in the non-transitory computer readable memory, configured to:
    convert the input video from a first frame rate to a second frame rate, wherein the second frame rate is a faster frame rate than the first frame rate;
    generate processed frames of the input video at the second frame rate; and aggregate the processed frames using temporal sliding window aggregation to yield a processed output video at a third frame rate, which includes:
   aligning and averaging a first set of the processed frames oriented with respect to a first reference frame inside a temporal sliding window; and
   aligning and averaging a second set of the processed frames oriented with respect to a second reference frame inside the temporal sliding window,
wherein the first set of processed frames and the second set of processed frames include at least one shared context frame, and
wherein the at least one shared context frame is positioned after the first reference frame and before the second reference frame.

11. The system of claim 10, wherein upon converting the input video from the first frame rate to the second frame rate, the processor is further configured to:
   determine an intermediate frame by calculating a weighted sum of a first video frame at a first time step and a second video frame at a second time step.

12. The system of claim 11, wherein upon calculating the weighted sum of the first video frame at the first time step and the second video frame at the second time step, the processor is further configured to:
   calculate a forward warping grid from the first video frame to a third time step corresponding to the intermediate frame;
   calculate a backward warping grid from the second video frame to the third time step corresponding to the intermediate frame;
   determine the intermediate frame at the third time step by bilinearly warping the first video frame and the second video frame to the third time step.

13. The system of claim 10, wherein upon converting the input video from the first frame rate to the second frame rate, the processor is further configured to:
   convert both the input video and an occlusion mask from the first frame rate to the second frame rate,
   wherein the occlusion mask indicates regions of the input video to process.

14. The system of claim 13, wherein upon generating the processed frames of the input video at the second frame rate, the processor is further configured to:
   independently process each frame of the input video at the second frame rate with the occlusion mask at the second frame rate, wherein generating the processed frames includes at least one of enhancement processing, sharpening processing, denoising processing, super-resolution processing, and inpainting processing.

15. The system of claim 10, wherein upon aggregating the processed frames using temporal sliding window aggregation, the processor is further configured to:
   select a temporal sliding window having a predetermined stride; and
   align and average at least some of the processed frames inside the temporal sliding window.

16. The system of claim 15, wherein the processed frames that are aligned and averaged inside of the temporal sliding window include the first reference frame and at least two context frames.

17. The system of claim 16, wherein the at least two context frames include at least one context frame positioned before the first reference frame and at least one context frame positioned after the first reference frame.

18. The system of claim 10, wherein the first frame rate is equal to the third frame rate.

* * * * *